(12) United States Patent
Silva

(10) Patent No.: US 12,214,386 B2
(45) Date of Patent: Feb. 4, 2025

(54) STRUCTURAL-COUPLING SYSTEM FOR LASER AND METHOD OF USE

(71) Applicant: Adapt Laser Systems, LLC, Kansas City, MO (US)

(72) Inventor: Steven L. Silva, Leawood, KS (US)

( * ) Notice: Subject to any disclaimer, the term of this patent is extended or adjusted under 35 U.S.C. 154(b) by 101 days.

(21) Appl. No.: 17/986,248

(22) Filed: Nov. 14, 2022

(65) Prior Publication Data

US 2023/0149983 A1 May 18, 2023

Related U.S. Application Data

(60) Provisional application No. 63/278,901, filed on Nov. 12, 2021.

(51) Int. Cl.
| | |
|---|---|
| *B08B 7/00* | (2006.01) |
| *B23K 26/06* | (2014.01) |
| *B23K 26/38* | (2014.01) |
| *B23K 26/40* | (2014.01) |
| *G21D 1/02* | (2006.01) |
| *H01S 3/094* | (2006.01) |

(52) U.S. Cl.
CPC ........ *B08B 7/0042* (2013.01); *B23K 26/0648* (2013.01); *B23K 26/38* (2013.01); *B23K 26/40* (2013.01); *H01S 3/094019* (2013.01); *G21D 1/02* (2013.01)

(58) Field of Classification Search
CPC .. B08B 7/0042; B23K 26/0648; B23K 26/38; B23K 26/40; H01S 3/094019; G21D 1/02; G21F 7/005; G21F 9/005
See application file for complete search history.

(56) References Cited

U.S. PATENT DOCUMENTS

| | | | | |
|---|---|---|---|---|
| 5,780,806 | A | * 7/1998 | Ferguson | ............... B08B 7/0042 134/1 |
| 5,986,234 | A | * 11/1999 | Matthews | .......... B23K 26/1476 219/121.68 |

(Continued)

OTHER PUBLICATIONS

Hu, Y.; Liu, C.; Li, K.; Cheng, J.; Zhang, Z.; Han, E. An Efficient Laser Decontamination Process Based on Non-Radioactive Specimens of Nuclear Power Materials. Materials 2023, 16, 7643 (Year: 2023).*

(Continued)

*Primary Examiner* — David A Vanore
(74) *Attorney, Agent, or Firm* — Law Office of Mark Brown, LLC; Christopher M DeBacker

(57) ABSTRACT

A structural coupling for use within a laser system. In a preferred embodiment, a laser system for cleaning purposes would be displaced within a facility having dangerous conditions which could potentially damage the components of the laser, such as within a nuclear power facility. Protecting the laser components typically requires shielding which can fail, resulting in potential contamination of laser generator and components. The structural coupling would allow the laser to pass through a structural element to be used on the interior of the facility such that the end effector may be freely used within the facility while the mobile laser unit itself is safely stored outside of the dangerous area. The coupling allows the laser to pass through the structural element or opening to the end effector without exposing the laser itself to potential contamination.

8 Claims, 4 Drawing Sheets

(56) References Cited

U.S. PATENT DOCUMENTS

| | | | | |
|---|---|---|---|---|
| 6,693,255 B2* | 2/2004 | Freiwald | ............. | B23K 26/142 |
| | | | | 219/121.68 |
| 6,815,638 B2* | 11/2004 | Liu | ..................... | B23K 26/073 |
| | | | | 219/121.71 |
| 7,038,164 B2* | 5/2006 | Denney | ................ | B23K 26/032 |
| | | | | 219/121.68 |
| 7,057,134 B2* | 6/2006 | Denney | ................ | B23K 26/128 |
| | | | | 219/121.68 |
| 7,525,065 B2* | 4/2009 | Engler | ................ | B23K 26/361 |
| | | | | 219/121.69 |
| 9,089,928 B2* | 7/2015 | Zediker | ............. | B23K 26/0096 |
| 2008/0121248 A1* | 5/2008 | Turco | .................... | G21F 9/005 |
| | | | | 134/1 |
| 2009/0224178 A1* | 9/2009 | Champonnois | ....... | B08B 7/0042 |
| | | | | 250/492.1 |
| 2010/0116801 A1* | 5/2010 | Mukai | .................. | B08B 7/0042 |
| | | | | 219/121.85 |
| 2012/0053387 A1* | 3/2012 | Thro | .................... | B23K 26/146 |
| | | | | 588/306 |
| 2022/0118486 A1* | 4/2022 | Mattar | .................. | B08B 7/0042 |
| 2023/0149983 A1* | 5/2023 | Silva | ................. | B23K 26/0648 |
| | | | | 134/42 |

OTHER PUBLICATIONS

Delaporte et al., Dry excimer laser cleaning applied to nuclear decontamination, 2003, Applied Surface Science, 208-209, 298-305 (Year: 2003).*

Wang et al., Laser decontamination for radioactive contaminated metal surface: A review, 2023, Nuclear Engineering and Techonology, 55, 2023, 12-24 (Year: 2023).*

Greifzu et al., Laser-based decontamination of metal surfaces, 2019, Optics and Laser Technology 117 (2019) 293-298 (Year: 2019).*

* cited by examiner

STRUCTURAL-COUPLING SYSTEM FOR LASER AND METHOD OF USE

CROSS-REFERENCE TO RELATED APPLICATION

This application claims priority in U.S. Provisional Patent Application No. 63/278,901 Filed Nov. 12, 2021, which is incorporated herein by reference.

BACKGROUND OF THE INVENTION

1. Field of the Invention

The present invention relates generally to a laser coupling system and method for use thereof, and more specifically to a laser coupling system for connecting a fiber laser or fiber delivered laser at a remote interface or bulk head interface for protecting or isolating the laser generator from the laser optical output. Common applications of the invention will be within a power facility during shut down periods for maintenance and cleaning.

2. Description of the Related Art

Laser cleaning via ablation is often used to clean and remove coatings from the surfaces of chemical plants, petrochemical plants, power facilities, nuclear facilities, and other industrial plants and facilities. Laser ablation is becoming a more common maintenance decoating process necessary to maintain proper functions of such facilities. However, in some situations, radiation or other risks could damage laser equipment, necessitating expensive and tedious shielding for the laser equipment. What is needed is a system which allows the laser optic to be used within a contaminated or otherwise dangerous location while retaining the delicate components of the laser system in an exterior, safe location. Sometimes the dividing line between contaminated or hazardous area is an open ingress/egress which must be cleared and removed of blockage in an emergency situation. A method to allow for fiber and optic coupling at the ingress/egress and/or through a barrier and provide quick isolation of the optical elements is essential.

Heretofore there has not been available a system or method for a laser system with the advantages and features of the present invention.

BRIEF SUMMARY OF THE INVENTION

The present invention generally provides a structural coupling for use within a laser system. In a preferred embodiment, a laser system for cleaning purposes would be displaced within a facility having dangerous conditions which could potentially damage the components of the laser, such as within a nuclear power facility. In such an environment, protecting the laser components typically requires shielding which can fail, resulting in potential contamination of laser generator and components. In the preferred embodiment, the structural coupling would allow the laser to pass through a structural element, such as a wall, or at a pass-through location such as an ingress or egress location to be used on the interior of the facility such that the end effector may be freely used within the facility while the mobile laser unit itself is safely stored outside of the dangerous area. The coupling allows the laser to pass through the structural element or opening to the end effector without exposing the laser itself to potential contamination.

In the preferred embodiment, a quick connect fiber or a "fiber to fiber" coupling allows for laser beam delivery in an area of high contamination or nuclear exposure while keeping the laser system and controls external to the restricted area.

BRIEF DESCRIPTION OF THE DRAWINGS

The drawings constitute a part of this specification and include exemplary embodiments of the present invention illustrating various objects and features thereof.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

II. Preferred Embodiment Structural Coupling Laser System 2

Figure 1:
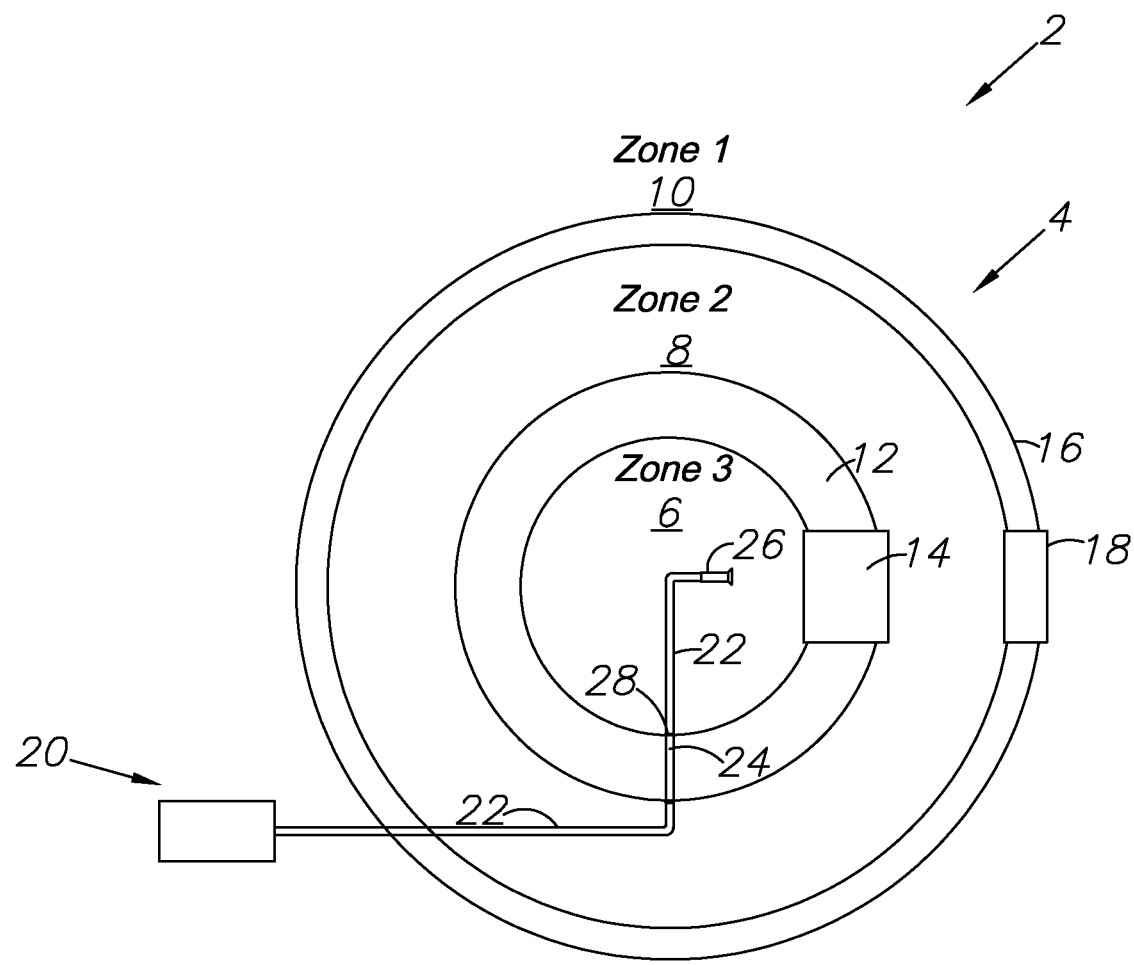
FIG. 1 is a diagrammatic plan view of a typical environment where an embodiment of the present invention may be deployed, identifying areas of danger or concern.

FIG. 1 shows how zones within a facility 4, such as a nuclear power facility, may include several different ranges of danger or potential contamination. A primary purpose of the present invention is to allow the use of a laser system for cleaning one of the interior zones while retaining the delicate elements of the laser on the exterior of the dangerous or hazardous area.

As shown, the environment is divided into three zones. Zone One 10 is a clean zone. All zones from here on out to the exterior would be "clean" from hazardous radiation or other dangers that are present in the other zones. The laser 20 is shown to reside in this area but can also be placed in Zone Two 8 depending on the level of radiological contamination. A high power fiber cable 22 can connect the laser 20 via structural coupling 24 featuring a fiber-to-fiber interface is stubbed between the barrier 12 between Zone Two 8 and Zone Three 6.

Zone Two 8 is a restricted contaminated area. A door 18 or designated ingress/egress location within the barrier 16 may provide access to this zone. The laser 20 can be in this zone depending on company policies and procedures. Typically, anything that moves air in or out of a system needs to be filtered and has a higher risk of contamination. If a water chiller or air filter unit 30 is stored in this zone it may become contaminated. If the water chiller or air filter unit is integrated with the laser system, the entire laser may be lost to this zone. An external water chiller and separated air filter unit could be installed in this area and laser changed to a water-water system which would allow for the chiller to remain in Zone Two while minimizing chances of the laser needing to be retained within this zone due to contamination.

Zone Three 6 is a radiologically controlled area. A door or designated ingress/egress location 14 within the barrier 12 may provide access to this zone. In a nuclear power facility environment, there are loose alpha particles in this zone. Everything taken into this zone must be protected or sealed. Items taken into this zone may be lost to this zone and must be left behind if contaminated. Smaller water chiller units and local fume extraction systems can be brought into Zone Three but will likely need to be kept in this area until final disposal.

Figure 2:
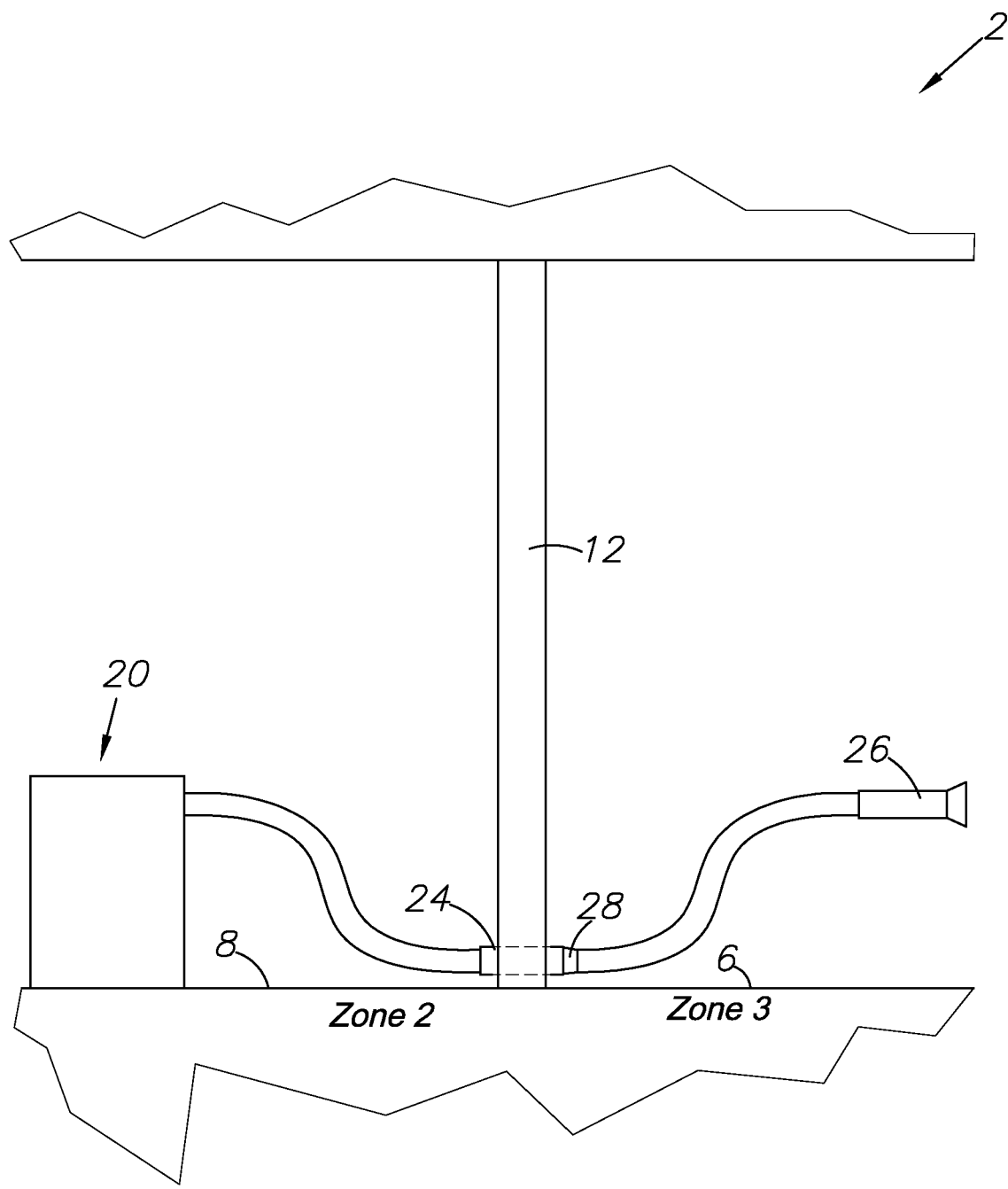
FIG. 2 is an elevational drawing showing an embodiment of the present invention.

FIG. 2 shows how a structural coupling 24 can bridge a wall 12, 16 or other structural element to allow for use of the laser system 20 on the interior of the structure while safely storing the delicate elements of the laser system on the safe, exterior. Here it is shown how a structural separation barrier 12, such as a wall, can separate a laser 20 from the optic 26 (also referred to as an end effector) via a pair of fibers 22 connected at a coupling 24 which passes through the structural separation barrier 12 and which can directly connect to the fibers on either side. This allows the laser components 20 to be retained within the safer zone (e.g. Zone One 10 or Zone Two 8) while the optical end 26 is deployed in the dangerous zone (e.g. Zone Three 6).

Figure 3:
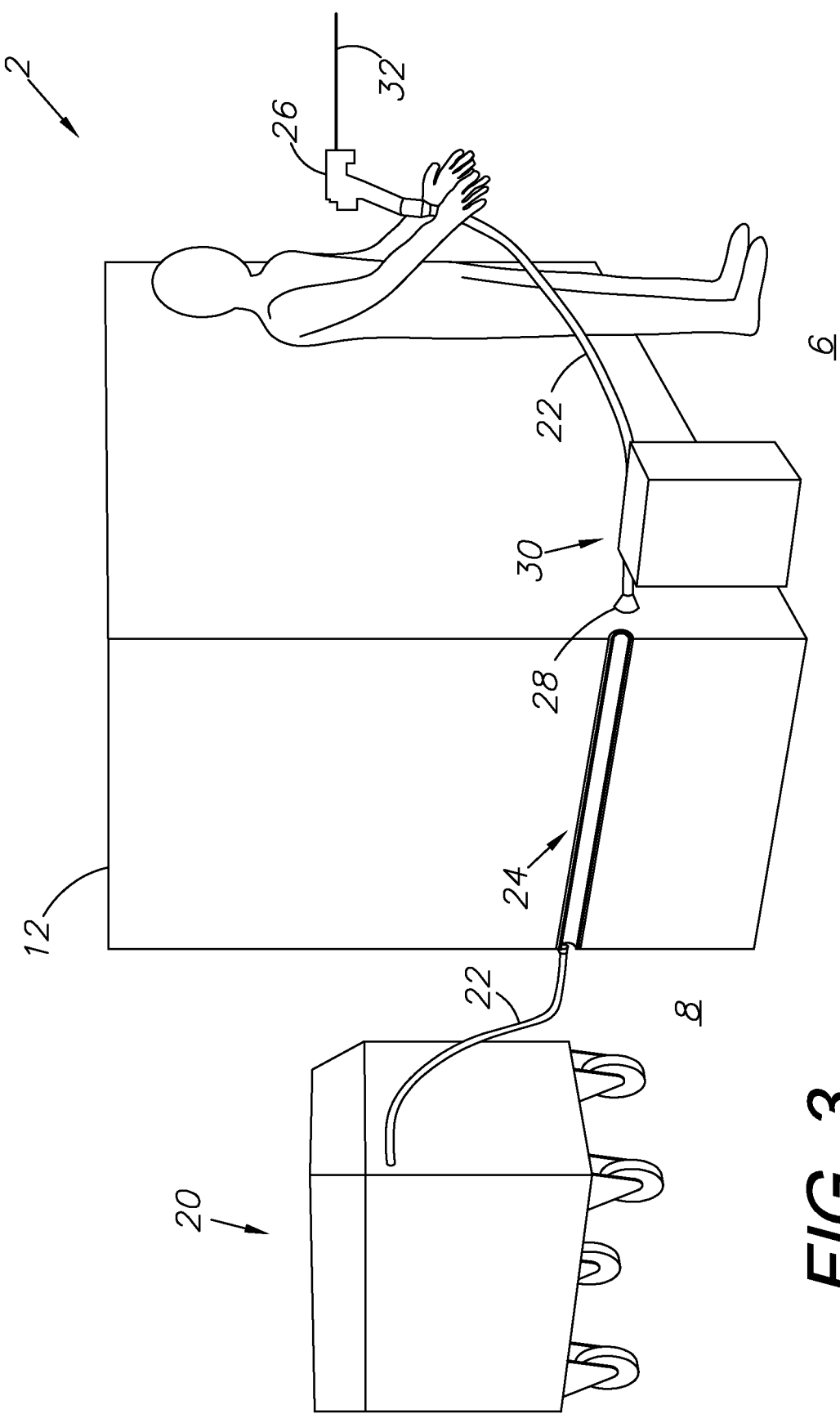
FIG. 3 is a three-dimensional view thereof.

FIG. 3 shows how the laser 20 and coupling 24 would be integrated in a real-world environment. The facility 4 has a wall 12 which is penetrated by the coupling 24. The optical connectors 28 allow for the laser 20 to send its beam through the wall 12 via the coupling 24 and be usable via the optic 26.

Figure 4:
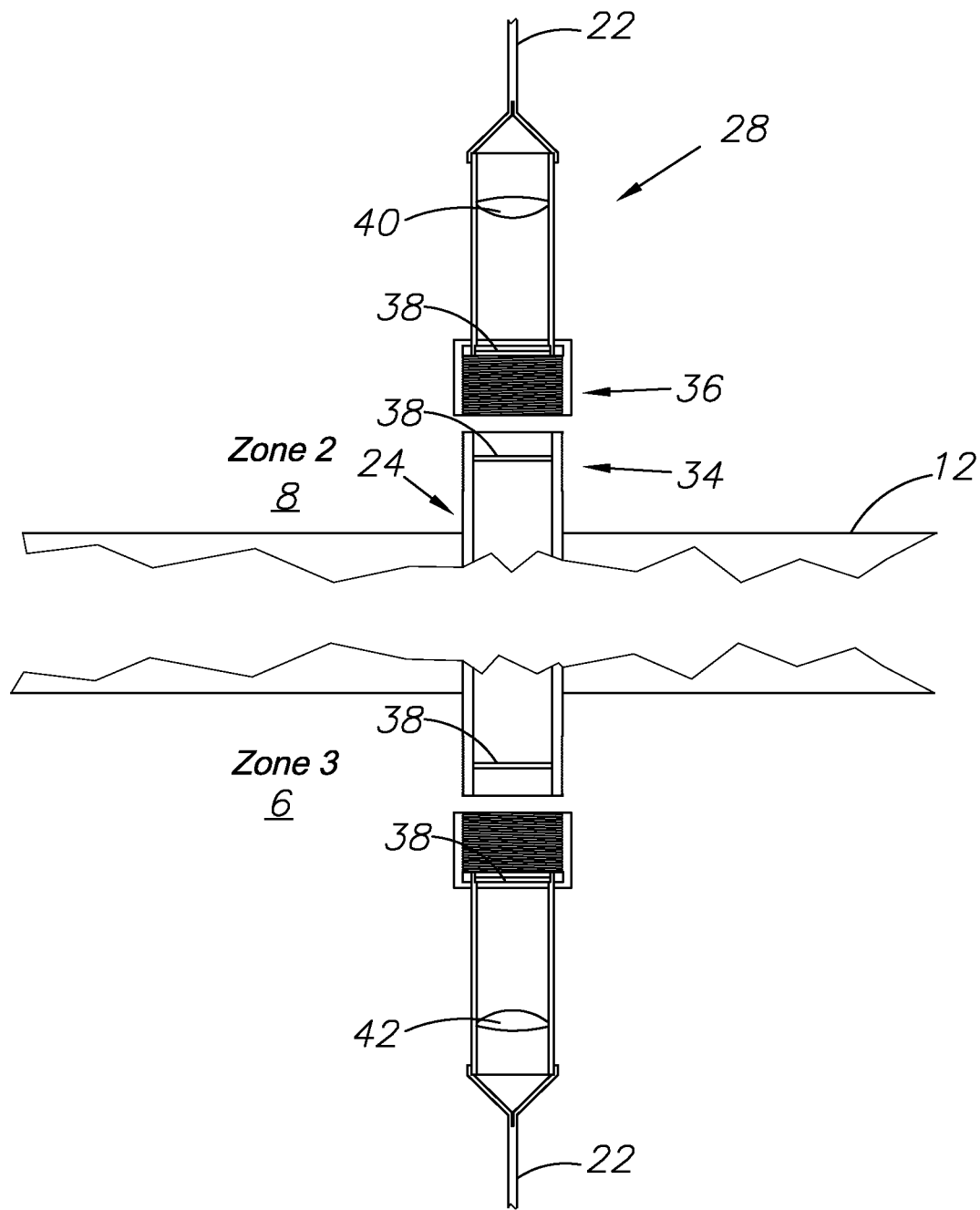
FIG. 4 is a sectional view about a connector element thereof.

FIG. 4 shows a sectional view of the coupling 24 passing through the wall 12 between the safer zone, Zone Two 8, and the contaminated zone, Zone Three 6. The first end of the coupling 24 connects to a fiber 22 connecting back to the laser 20 via a first optical connector 28 which has a collimation lens 40 within the connector. A protection window 38 is disposed between the collimation lens 40 and the threaded connector 36 which threads onto a corresponding threaded receiver 34 of the coupling 24. The optical channel through a structure will be protected by means of a protection window 38 on each end as well. Other connection means may be suitable.

Similarly, a separate fiber 22 connects to the optic 26 which includes its own identical connector 28 and which houses a focus lens set 42 between the fiber and another protection window 38. The collimation lens and the focus lens set allow the connector 24 to seamlessly transfer the laser 32 through the coupling 24.

While the examples provided above show one application of the present invention, other enclosures (e.g. submarines) may include similar needs for separating a laser source from an optic for laser ablation or other purposes. The structural connector would be usable through any barrier of any thickness and would protect the laser source from contamination or other undesirable effects that may otherwise result from being placed in the same enclosure as the optic.

It is to be understood that while certain embodiments and/or aspects of the invention have been shown and described, the invention is not limited thereto and encompasses various other embodiments and aspects.

Having thus described the invention, what is claimed as new and desired to be secured by Letters Patent is:

1. A structural coupling system for a laser, the system comprising:
   a laser source placed within a lower contaminated zone of a nuclear power facility;
   an optical end displaced within a contaminated zone of said nuclear power facility;
   a barrier separating said less lower contaminated zone and said contaminated zone;
   said optical end connected to a structural coupling passing through said barrier via a first optical fiber;
   said laser source connected to said structural coupling via a second optical fiber; and
   wherein said laser source provides the laser to said optical end via said second optical fiber, said structural coupling, and said first optical fiber such that said laser source remains in a lower contaminated zone while said optical end works within said contaminated zone.

2. The system of claim 1, wherein said first optical fiber comprises a quick disconnect for selectively disconnecting from said structural coupling.

3. The system of claim 1, further comprising:
   said structural coupling comprising a first end located in said second zone and a second end located in said first zone;
   a protection window located adjacent to each of said first and second ends of said structural coupling;
   a focus lens located in proximity to said first end of said structural coupling;
   a collimation lens located in proximity to said second end of said structural coupling; and
   said focus lens and said collimation lens configured to transmit said laser from said first optical fiber to said second optical fiber.

4. The system of claim 1, further comprising:
   said structural coupling comprising a first end located in said contaminated zone and a second end located in said first zone;
   said first end comprising a first threaded receiver for receiving a threaded connector affixed to said first optical fiber; and
   said second end comprising a second threaded receiver for receiving a threaded connector affixed to said second optical fiber.

5. A method of cleaning a contaminated zone with a laser, the method comprising the steps:
   providing a laser source within a non-contaminated zone;
   generating a laser from said laser source;
   sending said laser through a first optical fiber;
   connecting said first optical fiber to a first end of a structural coupling passing through a barrier separating said non-contaminated zone from the contaminated zone;
   connecting a second optical fiber to a second end of said structural coupling; and
   connecting an optic to said optical fiber and cleaning said contaminated zone via said optic.

6. The method of claim 5, wherein:
   a protection window located adjacent to each of said first and second ends of said structural coupling;

a focus lens is located in proximity to said first end of said structural coupling;

a collimation lens is located in proximity to said second end of said structural coupling; and said focus lens and said collimation lens configured to transmit said laser from said first optical fiber to said second optical fiber.

7. A method of operating a laser, the method comprising the steps:

providing a laser source within a first space;

generating a laser from said laser source;

sending said laser through a first optical fiber;

connecting said first optical fiber to a first end of a structural coupling passing through a barrier separating said first space from a second space, wherein said second space is entirely enclosed;

connecting a second optical fiber to a second end of said structural coupling; and connecting an optic to said second optical fiber and utilizing said laser within said second space via said optic.

8. The method of claim 7, further comprising the steps:

providing a pair of protection windows, each located adjacent to a respective one of said first and second ends of said structural coupling;

providing a focus lens is located in proximity to said first end of said structural coupling;

providing a collimation lens is located in proximity to said second end of said structural coupling; and transmitting said laser through focus lens and said collimation lens, thereby transferring said laser from said first optical fiber to said second optical fiber.

* * * * *